United States Patent Office 3,772,306
Patented Nov. 13, 1973

3,772,306
1,2,4a,5,6,8,9,14,14a,14b-DECAHYDROBENZ[a]
INDOLO[2,3-g]QUINOLIZIN-3(4H)-ONES
Glenn C. Morrison, Dover, and John Shavel, Jr., Mendham, N.J., assignors to Warner-Lambert Company, Morris Plains, N.J.
No Drawing. Filed Nov. 26, 1971, Ser. No. 202,570
Int. Cl. C07d 39/00
U.S. Cl. 260—288 R         4 Claims

ABSTRACT OF THE DISCLOSURE

Compounds of the formula are disclosed:

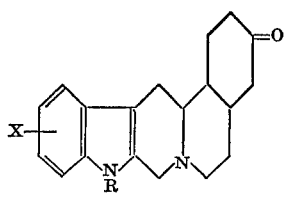

wherein X is hydrogen, lower alkyl, lower alkoxy, halogen, amino, N,N-disubstituted amino, etherified mercapto, nitro and hydroxyl; and R is hydrogen, lower alkyl, aralkyl, substituted aralkyl and acyl.

These compounds are prepared by the cyclization of a 1,2,3,4-tetrahydro-1(indol - 3 - ylmethyl)-6-methoxyisoquinoline with formaldehyde to give a hexahydro-3-methoxybenz[a]indolo[2,3-g]quinolizine, followed by reduction and hydrolysis respectively.

These compounds are useful as anti-hypertensive agents.

---

The present invention is concerned with 1,2,4a,5,6,8,9, 14,14a,14b - decahydrobenz[a]indolo[2,3 - g]quinolizin-3(4H)-ones having the following structural formula:

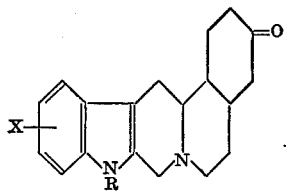

where X=hydrogen, lower alkyl such as methyl, ethyl, isobutyl, hexyl, and the like, lower alkoxy such as methoxy and ethoxy, halogen such as fluorine, chlorine and bromine, amino, N,N-disubstituted amino and the like, etherified mercapto such as methylmercapto and ethylmercapto, nitro and hydroxyl.

where R=hydrogen, lower alkyl such as methyl, ethyl, isobutyl, hexyl and the like, aralkyl such as phenethyl, substituted aralkyl such as chlorobenzyl, and acyl such as acetyl, benzoyl and the like.

Also embraced within the scope of this invention are the pharmaceutically accepted acid addition salts of the aforedescribed bases, their quaternary ammonium salts and N-oxides.

The symbols R and X as used hereinafter have the meaning as defined.

The invention also includes within its scope a new and novel process for preparing the above compounds as well as the intermediates employed for their synthesis.

The compounds of this invention exhibit anti-hypertensive activity in several mammalian species such as cats, dogs, guinea pigs and the like. For example, a dose of about 1 mg. per kg. to 10 mg. per kg. administered by injection to dogs significantly reduces the arterial pressure.

These compounds are indicated in conditions associated with high blood pressure. Generally speaking, a dose of 10–100 mg. based on the body weight in several divided doses as prescribed to produce the desired hypotensive activity.

In order to use these compounds, they are formulated by pharmaceutically acceptable vehicles such as peanut oil, sesame oil and the like into dosage forms suitable for parenteral administration.

The compounds of this invention are prepared by the cyclization of a 1,2,3,4-tetrahydro-1(indol-3-ylmethyl)-6-methoxyisoquinoline with formaldehyde to give a hexahydro-3-methoxybenz[a]indolo[2,3-g]-quinolizine of the formula:

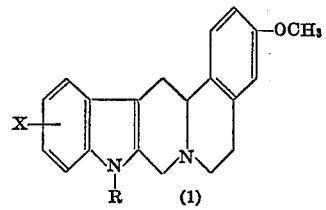

The reduction of (1) affords a dihydro derivative of the formula:

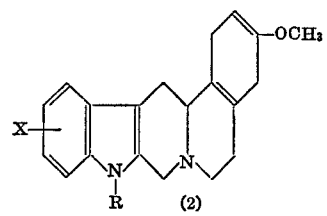

This reaction is usually carried out in liquid ammonia using an alkali metal such as sodium and an alcohol such as t-butanol.

Hydrolysis of (2) with a mineral acid such as hydrochloric acid affords an unsaturated ketone of the formula:

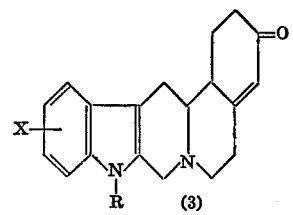

The unsaturated ketone (3) can be reduced with lithium in liquid ammonia to give isomer A or catalytically with palladium to give isomer B of a decahydrobenz[a]indolo[2,3-g]quinolizin-3(4H)-one of the formula:

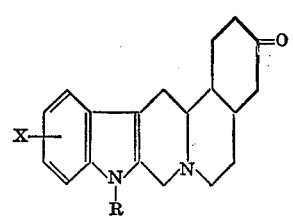

In order to further illustrate the practice of this invention, the following examples are included.

EXAMPLE 1

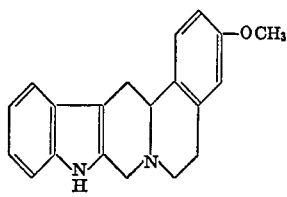

5,6,8,9,14,14a-hexahydro-3-methoxybenz[a]indolo
[2,3-g]quinolizine

To a solution of 29.2 g. of 1,2,3,4-tetrahydro-1-(indol-3-ylmethyl)-6-methoxyisoquinoline and 3.96 ml. of 37% formaldehyde solution in 2 l. of 3% acetic acid was added 1 l. of an 1 N sodium hydroxide solution over a 5 hour interval. Filtration of the reaction mixture gave a solid which after recrystallization from benzene afforded 22.0 g. (72%) of a solid, M.P. 201.5–203.5. Recrystallization from Skellysolve B gave an analytical sample, M.P. 202–203.5°.

*Analysis.*—Calcd. for $C_{20}H_{20}N_2O$ (percent): C, 78.92; H, 6.62; N, 9.20. Found (percent): C, 78.95; H, 6.60; N, 9.15.

EXAMPLE 2

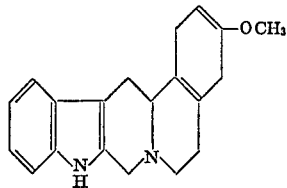

1,4,5,6,8,9,14,14a-octahydro-3-methoxybenz[a]
indolo[2,3-g]quinolizine

To a solution of 15.0 g. of 5,6,8,9,14,14a-hexahydro-3-methoxybenz[a]indolo[2,3-g]quinolizine in 500 ml. of tetrahydrofuran was added 1 l. of liquid ammonia. To the resulting solution was added 7.2 g. of sodium and 32 ml. of t-butanol in six equal portions over a 5-hr. period. The unreacted sodium was destroyed with methanol and the ammonia was allowed to evaporate. The residue was poured into 1500 ml. of water. A solid was deposited which after slurring with 750 ml. of hot isopropyl ether gave 13.9 g. (92%) of a solid, M.P. 212–214°.

*Analysis.*—Calcd. for $C_{20}H_{22}N_2O$ (percent): C, 78.40; H, 7.24; N, 9.14. Found (percent): C, 78.38; H, 7.40; N, 9.16.

EXAMPLE 3

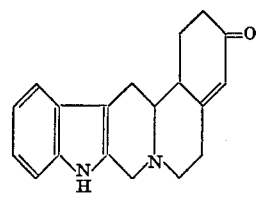

1,5,6,8,9,14,14a,14b-octahydrobenz[a]indolo[2,3-g]
quinolizin-3(2H)-one

A solution of 10.2 g. of 1,4,5,6,8,9,14,14a-octahydro-3-methoxybenz[a]indolo[2,3-g]quinolizine and 75 ml. of hydrochloric acid in 200 ml. of methanol was refluxed for 1.5 hr. The methanol was removed in vacuo and 75 ml. of water was added. The solution was made basic with 40% sodium hydroxide solution and extracted with methylene chloride. The methylene chloride layer was washed with water, dried over sodium sulfate, and the solvent was removed. Trituration of the residue with acetonitrile afforded 4.6 g. (48%) of a crystalline solid, M.P. 217–224°. Further recrystallization gave an analytical sample, M.P. 219–220°.

*Analysis.*—Calcd. for $C_{19}H_{20}N_2O$ (percent): C, 78.05; H, 6.90; N, 9.58. Found (percent): C, 77.82; H, 6.99; N, 9.41.

EXAMPLE 4

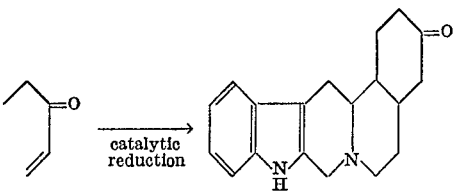

1,4,4a,5,6,8,9,14,14a,14b-decahydrobenz[a]indolo
[2,3-g]quinolizin-3(2H)-one

To a solution of 1.0 g. of 1,5,6,8,9,14,14a,14b-octahydrobenz[a]indolo[2,3-g]quinolizin-3(2H)-one and 6 ml. of 3 N hydrochloric acid in 150 ml. of methanol was added 500 mg. of 10% palladium on charcoal and the mixture was hydrogenated. After hydrogen uptake had ceased the catalyst was removed by filtration. On concentration of the solution there was deposited a solid. The solid was shaken with 10% sodium hydroxide solution and methylene chloride. The methylene chloride layer was washed with water, dried over sodium sulfate, and the solvent was removed. Crystallization of the residue from ether afforded 0.33 g. (33%) of a crystalline solid, M.P. 133–134°. Recrystallization from isopropyl ether gave an analytical sample, M.P. 144–145°.

*Analysis.*—Calcd. for $C_{19}H_{22}N_2O$ (percent): C, 77.52; H, 7.53; N, 9.52. Found (percent): C, 77.42; H, 7.57; N, 9.27.

EXAMPLE 5

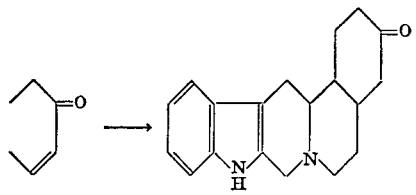

1,4,4a,5,6,8,9,14,14a,14b-decahydrobenz[a]indolo
[2,3-g]quinolizin-3(2H)-one

To a solution of 3.0 g. of 1,5,6,8,9,14,14a,14b-octahydrobenz[a]indolo[2,3-g]quinolizin-3(2H)-one in 125 ml. of tetrahydrofuran was added 250 ml. of ammonia. Then 0.12 g. of lithium was added and the mixture stirred for 1 hr. The excess lithium was destroyed by the addition of 0.19 g. of ammonium chloride over a 1 hr. interval and the ammonia was allowed to evaporate. On the addition of 700 ml. of water, there was deposited a solid which after recrystallization from benzene gave 1.8 g. (60%) of a crystalline solid, M.P. 288–293°. Further recrystallization gave an analytical sample, M.P. 300–304°.

*Analysis.*—Calcd. for $C_{19}H_{22}N_2O$ (percent): C, 77.52; H, 7.53; N, 9.52. Found (percent): C, 77.25; H, 7.60; N, 9.67.

We claim:
1. 1,4,4a,5,6,8,9,14,14a,14b - decahydrobenz[a]indolo [2,3-g]quinolizin-3(2H)-one.
2. 5,6,8,9,14,14a - hexahydro-3-methoxybenz[a]indol [2,3-g]quinolizine.
3. 1,4,5,6,8,9,14,14a-octahydro - 3 - methoxybenz[a] indolo[2,3-g]quinolizine.

4. 1,5,6,8,9,14,14a,14b - octahydrobenz[a]indolo[2,3-g]quinolizin-3(2H)-one.

References Cited

UNITED STATES PATENTS

| | | | |
|---|---|---|---|
| 3,480,633 | 11/1969 | Schut | 260—288 R |
| 3,492,303 | 1/1970 | Shavel et al. | 260—288 R |
| 3,518,271 | 6/1970 | Shavel et al. | 260—288 R |
| 3,524,857 | 8/1970 | Shavel | 260—288 R |

OTHER REFERENCES

Boekelheide et al.: Jour. Am. Chem. Soc., vol. 74, pp. 4920–3 (1952).

DONALD G. DAUS, Primary Examiner

U.S. Cl. X.R.

260—283 S, 287 R, 999